United States Patent [19]

Kawamata

[11] Patent Number: 5,011,395
[45] Date of Patent: Apr. 30, 1991

[54] SURFACE SMOOTHING APPARATUS FOR MAGNETIC RECORDING MEDIUM

[75] Inventor: Toshio Kawamata, Odawara, Japan

[73] Assignee: Fuji Photo Film Co., Ltd., Kanagawa, Japan

[21] Appl. No.: 515,154

[22] Filed: Jul. 19, 1983

[30] Foreign Application Priority Data

Aug. 12, 1982 [JP] Japan .................. 57-140168

[51] Int. Cl.$^5$ .................. B29C 59/04; B30B 3/04
[52] U.S. Cl. .................. 425/143; 425/174.8 E; 425/174.8 R; 425/363
[58] Field of Search ............ 264/26, 25, 28, DIG. 46, 264/DIG. 65; 425/174.8 R, 363, 174.8 E, 143; 156/73.1, 272.4; 427/45.1, 48, 128, 130

[56] References Cited

U.S. PATENT DOCUMENTS

| | | | |
|---|---|---|---|
| 2,288,269 | 6/1942 | Crandell | 264/DIG. 46 |
| 2,485,238 | 10/1949 | Hichok | 264/26 |
| 2,802,085 | 8/1957 | Rothacker | 219/10.61 |
| 2,948,929 | 8/1960 | Statland | 264/26 |
| 3,114,652 | 12/1963 | Schetky | 427/45.1 |
| 3,330,932 | 7/1967 | Gros | 219/10.41 |
| 3,488,411 | 1/1970 | Goldman | 425/174.8 |
| 3,702,912 | 11/1972 | Greenberger | 219/10.61 |
| 3,916,039 | 10/1975 | Akashi et al. | 427/128 |
| 3,985,604 | 10/1976 | Balla | 156/272.4 |
| 4,044,174 | 8/1977 | Carr | 427/128 |
| 4,100,326 | 7/1978 | Somezawa et al. | 427/128 |
| 4,173,607 | 11/1979 | Bahr | 264/26 |
| 4,192,048 | 3/1980 | Robillard | 264/27 |
| 4,216,179 | 8/1980 | Lamberto et al. | 425/371 |
| 4,293,509 | 10/1981 | Bucking | 264/26 |

FOREIGN PATENT DOCUMENTS

| | | | |
|---|---|---|---|
| 4473 | 2/1973 | Japan | 264/26 |
| 80924 | 12/1947 | Norway | 264/26 |

Primary Examiner—James Lowe
Attorney, Agent, or Firm—Sixbey, Friedman, Leedom & Ferguson

[57] ABSTRACT

A smoothing apparatus which includes at least one set of two rolls at least one of which is a metal roll, and a high-frequency dielectric heater positioned prior to the rolls. A magnetic recording medium is first heated by the high-frequency dielectric heater and then pressed between the rolls to smooth the surface of the magnetic layer of the magnetic recording medium.

3 Claims, 1 Drawing Sheet

SURFACE SMOOTHING APPARATUS FOR MAGNETIC RECORDING MEDIUM

BACKGROUND OF THE INVENTION

1. Field of the Invention

This invention relates to an apparatus for smoothing the surface of a flexible magnetic recording medium. This invention particularly relates to an improvement in an apparatus for smoothing the surface of a flexible magnetic recording medium wherein the flexible magnetic recording medium is passed through and pressed between at least one set of two rolls at least one of which is a metal roll.

2. Description of the Prior Art

As techniques for smoothing the surface of a magnetic recording medium, the following methods have heretofore been widely known:

(1) A method wherein the dispersant and the dispersing method used at the step of preparing a magnetic coating solution are improved to form a magnetic layer having a relatively smooth surface at the step immediately after the coating.

(2) A method wherein magnetic layers of recording media after coating and drying are contacted with each other and moved at high speeds with respect to each other to rub, grind and smooth the surfaces of the magnetic layers.

(3) A method wherein the magnetic layer surface is rubbed and ground with fur of animals, plastics, metals, ceramics, or the like.

(4) A method wherein the magnetic layer is smoothed by use of press rolls called supercalender rolls.

However, the conventional methods described above present the problems as described below. Namely, in method (1), the electromagnetic transducing characteristics, particularly the sensitivity and the signal-to-noise ratio obtained are not satisfactory. In method (2), the drop out due to chipping of the magnetic layers by the grinding is too great for the method to be put into practice. In method (3), it is impossible to conduct the surface smoothing required for a high-density recording medium. In method (4), surface smoothing is conducted by passing a recording medium several times between a metal roll and a plastic roll. In this method, since the nip pressure of the supercalender rolls is high, large loads are exerted on the rolls and roll noise occurs when the rolls cannot withstand high pressures. Further, the middle portions of the rolls are thermally expanded due to heat generated by the rolls when they are rotated in the pressed condition and/or due to heat for raising the roll temperature to a value within the range of 40° to 80° C. for the purpose of improving the smoothing effect. In this case, the pressing force of the rolls becomes uneven and, therefore, the thickness and/or smoothness of the magnetic recording medium obtained becomes uneven. In the case of a resilient roll, the hardness of roll becomes uneven or the roll is cracked when the condition as described above continues for long periods.

In the cases of tapes wherein only one tape side is used for recording, for example, video tapes, audio tapes, and computer tapes, the purpose of smoothing the magnetic layer surface can be accomplished by conducting calendering with the magnetic layer surface contacting the surface of the metal roll of the aforesaid supercalender rolls. Therefore, supercalenders, including various improved types, are widely used.

However, since the supercalendering method has various drawbacks as described above, it is necessary to frequently replace the resilient roll or polish the roll surfaces. Thus, the method is troublesome in practical use. This method also has a drawback that the pressure is too high (the linear pressure is within the range of 200 to 400 kg/cm) and that the roll itself must be heated (to a temperature of up to 80° C.). As magnetic tapes of higher recording density and higher performance come to be required, it will be desired to increase the temperature in smoothing above the working temperature of the conventional supercalender (in order to further smooth the magnetic surface). However, the smoothing temperature cannot be increased as desired for reasons of the conventional apparatus.

SUMMARY OF THE INVENTION

The primary object of the present invention is to provide a smoothing apparatus wherein the heating step and the pressing step for smoothing are conducted separately from each other.

Another object of the present invention is to provide a smoothing apparatus wherein the temperature control range in the heating step can be increased greatly and any temperature necessary for smoothing (up to 200° C.) can be obtained.

The specific object of the present invention is to provide a smoothing apparatus wherein a processing speed higher than the processing speed of the conventional apparatus can be obtained.

The smoothing apparatus in accordance with the present invention comprises a high-frequency dielectric heater positioned prior to press rolls, whereby a magnetic recording medium is first subjected to high-frequency dielectric heating and then pressed.

In the present invention, since the temperature can be controlled as desired within a broad temperature range, it is possible to decrease the pressing force of the rolls when the magnetic recording medium is passed through the rolls. As a result, the life of the metal roll and the resilient roll becomes long. Further, since the rolls need not be heated, the life of the rolls is further prolonged.

The conventional supercalender comprises three to ten pairs of pressing and heating rolls. However, in the present invention, it is sufficient to use, for example, one or two pairs of rolls. Therefore, the apparatus in accordance with the present invention is inexpensive and easy to operate and maintain.

Recently, flexible magnetic recording media are formed by applying a mixture of a magnetic material and a binder to a plastic film (substrate), and drying the mixture to form a magnetic layer. As the magnetic material, a a ferromagnetic material such as $\gamma$-$Fe_2O_3$, $Fe_3O_4$, Co-doped $\gamma$-$Fe_2O_3$, Co-doped $Fe_3O_4$, or $CrO_2$ is used. As the binder, for example, a vinyl chloride-vinyl acetate copolymer, a vinyl chloride-acrylonitrile copolymer, an acrylic easter-acrylonitrile copolymer, an acrylic ester-vinylidene chloride copolymer, other types of acrylic acid copolymers, a urethane, a nylon-silicone resin, nitrocellulose, a polyvinyl chloride, a vinylidene chloride-acrylonitrile copolymer, a polyamide resin, a polyvinyl butyral, a cellulose derivative, a styrene-butadiene copolymer, a phenol resin, an epoxy resin, a polyurethance, a urea resin, a melamine resin, a polyester resin, a chlorovinyl ether-acrylate copolymer a methacrylate copolymer-diisocyanate blend polymer an amino resin, various types of synthetic rubber, or the like may be used.

As the method of applying the magnetic coating solution, top reverse coating, bottom reverse coating, doctor coating, gravure coating, spray coating, or the like may be used. The substrate may, for example, be a non-magnetic polyethylene terephthalate film, a triacetyl cellulose film, a diacetyl cellulose film, a vinylidene chloride film, a polypropylene film, the Q Film (brand name of Teijin, Limited, of Japan) containing polyethylene naphthalate as the main ingredient, or the like. The polyethylene terephthalate film is used most widely. The thickness of the substrate is, in general, within the range of 4μ to 150μ. The magnetic coating solution applied to the substrate is dried at a temperature of about 100° C. for several minutes. In the present invention, after the magnetic recording medium is prepared as described above the dielectric resin used as the binder in the magnetic recording medium is heated and softened by the high-frequency dielectric heating method. Then, the magnetic recording medium is pressed and smoothed between a pair of highly planished rolls. The frequency used for the high-frequency dielectric heating is within the range of several kilohertz to several thousands of megahertz, and the most preferable frequency range is from several megahertz to several hundreds of megahertz.

DESCRIPTION OF THE PREFERRED EMBODIMENTS

The present invention will hereinbelow be described in further detail with reference to the accompanying drawings.

Figure 1:
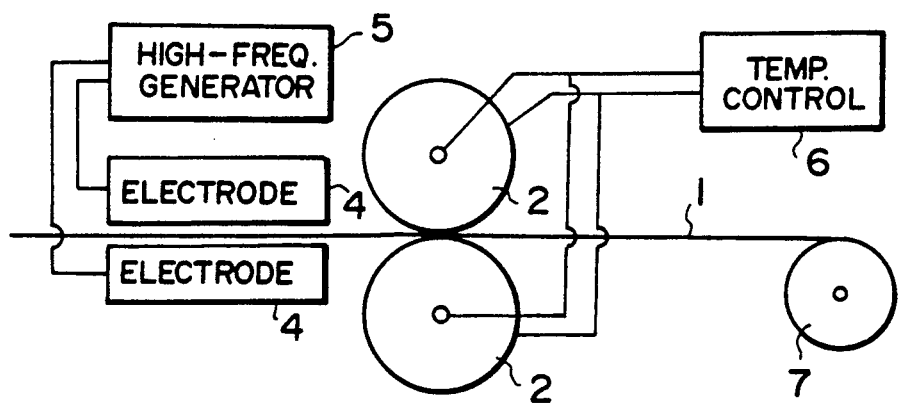
FIGS. 1 to 3 are schematic views showing various embodiments of the smoothing apparatus in accordance with the present invention.

Referring to FIG. 1, a flexible magnetic recording medium (web) 1 is passed and planished between a pair of planished metal rolls 2, 2. In front of the metal rolls 2, 2, high-frequency generator electrodes 4,4 are positioned above and below the path of the medium 1. A high frequency is applied from a high-frequency generator 5 to the electrodes 4, 4 to heat and soften the binder of the medium 1 by high-frequency dielectric heating. Rolls 2,2 are connected to a temperature regulator 6 for controlling their surface temperatures. The heated and pressed magnetic recording medium (web) 1 is wound around a web wind-up roll 7.

Figure 2:
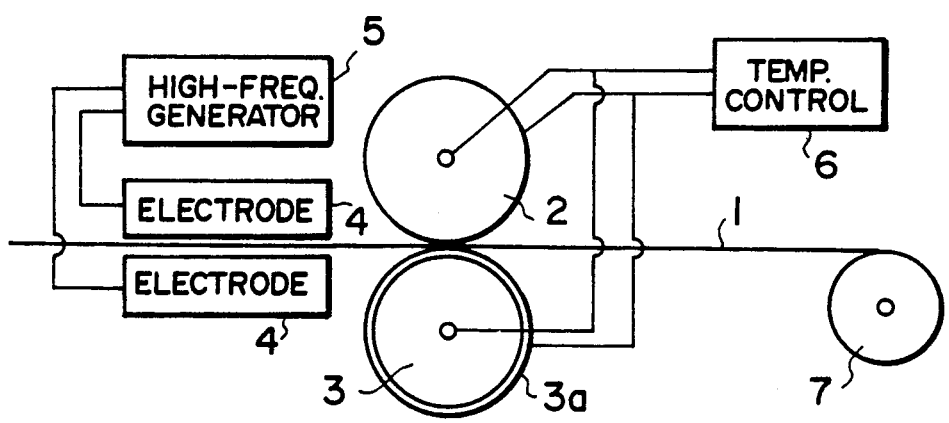
Figure 3:
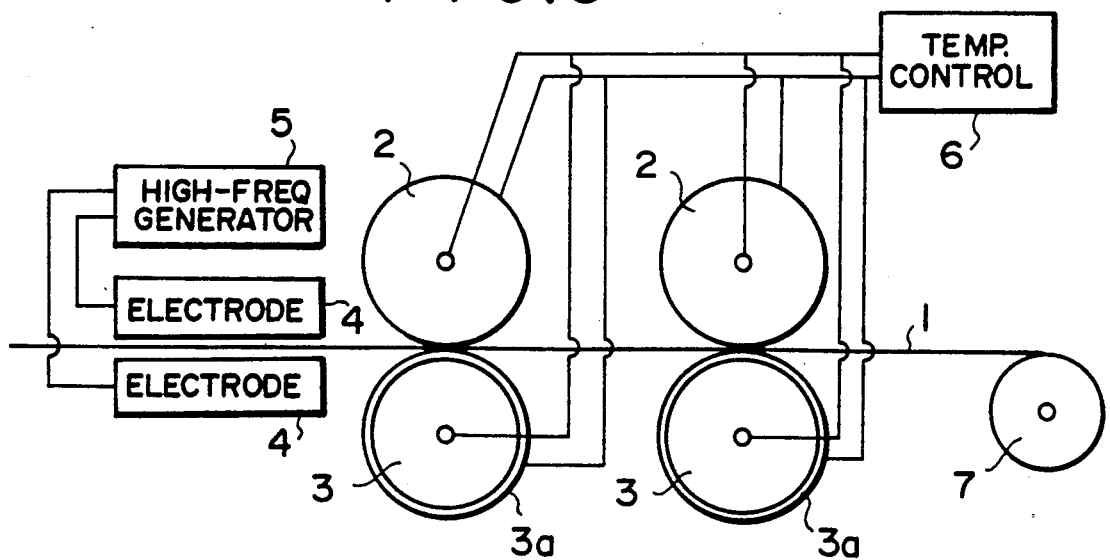

FIG. 2 shows another embodiment of the apparatus in accordance with the present invention, which is similar to the embodiment of FIG. 1 except that a metal roll 2 is contacted with a plastic-coated roll 3 comprising a plastic layer 3a coated on the surface of a metal roll. FIG. 3 shows a further embodiment of the apparatus in accordance with the present invention, which is similar to the embodiment of FIG. 2 except that two pairs of rolls 2, 3 as shown in FIG. 2 are installed.

The smoothing apparatus in accordance with the present invention using high-frequency heating at the pre-rolling stage has various advantages as described below over the external heating method used in the conventional supercalender wherein metal rolls are heated electrically, with hot water or by dielectric heating and a medium is heated by the rolls:

(1) Heating is conducted uniformly since the heat is generated by the molecules within the dielectric binder.

(2) Since heat is internally generated in the medium, temperature unevenness in the thickness direction of the medium does not occur as in the case of the conventional external heating as described above. (In the conventional external heating, the surface of the medium becomes hot, but the inside of the medium does not.)

(3) The temperature of the medium rises quickly, and the temperature rise speed can be controlled as desired.

(4) When the material to be heated is a composite material comprising materials exhibiting dielectric constants or power factors different from each other, it is possible to selectively heat the material. In the magnetic recording medium, the polyethylene terephthalate film used as the substrate is not heated, and the magnetic layer can be heated alone.

(5) The apparatus is inexpensive compared with the other external heating systems.

The material that can be heated by dielectric heating at a frequency within the aforesaid range is mainly the binder used in the magnetic layer. As is well known, the dielectric constant and the dielectric power factor of the dielectric substance are the important factors in heating, and the amount of heat generated (P) can be represented by the formula of $$P = k f x \epsilon x E^2 x \tan \delta \times 10^{-12} (W/cm^3)$$

wherein k designates the coefficient, f denotes the frequency applied, $\epsilon$ designates the dielectric constant, E denotes the intensity of electric field, and tan $\delta$ denotes the dielectric power factor.

Among the aforesaid binder materials used in the magnetic layer, vinyl chloride, vinyl chloride-vinyl acetate, vinylidene chloride, urethane and polyamide compounds are readily heated by dielectric heating. Particularly, vinyl chloride, vinyl chloride-vinyl acetate and vinylidene chloride compounds are very readily heated by dielectric heating.

As in the case of conventional supercalender rolls, the press rolls should be highly planished on the surfaces and involve no eccentricity. In each pair of rolls, at least one roll should be a metal roll, and the other roll may a metal roll or any of various types of plastic rolls. The plastic rolls may comprise a metal roll and a plastic layer coated on the metal roll. The plastic layer may be made of a polyamide resin, a silicone resin, a polyester resin, an FRP, ethylene tetrafluoride (Teflon), a phenol resin, or the like. It is also possible to use a roll provided with a layer of asbestos, or the like.

In the present invention, the press rolls need not be heated. Rather, the rolls should preferable by constructed so that they can be cooled since there is the probability that the roll temperature will rise gradually due to heat of the medium heated at the heating section prior to the rools.

The present invention will further be illustrated by the following nonlimitative example.

TABLE 1

| Composition | Parts by weight |
| --- | --- |
| γ-Fe$_2$O$_3$ | 300 |
| (0.4 × 0.07 × 0.07μ) | |
| Vinyl chloride-vinyl acetate resin | 50 |
| Urethane resin | 30 |
| Plasticizer (Triphenylphosphate) | 5 |
| MEK: toluene (4:6) | 900 |

A coating solution was prepared by dispersing the composition as shown in Table 1 for 48 hours in a ball mill. Then, the coating solution was applied to a 20μ-thick polyethylene terephthalate film so as to obtain a dry coating with a thickness of 5μ. In this manner, a 1000 m bulk roll was obtained.

Half of the obtained bulk roll was processed in a conventional supercalender comprising eight pairs of press rolls (with the magnetic surface facing the metal roll side) (metal roll temperature: 80° C., linear pressure: 300 kg/cm, web speed: 50 m/min). The remaining half of the bulk roll was processed by the smoothing apparatus in accordance with the present invention. At the heating section, the output was 4 KW, the frequency was 45 MHz, and the heating time was 1 second. At the pressing section, one of the paired rolls was the same planished metal roll as the metal roll used in the aforesaid supercalender, and the other roll was a polyamide-coated roll. The temperature of both rolls was adjusted to 33°±2° C. Thus, a pair of rolls were used, the linear pressure was 80 kg/cm, and the web speed was 50 m/min. The glossiness under 45° exposure was measured according to JIS Z 8741, and the surface smoothness of the samples was compared. (The 45° glossiness when black glass having a refractive index of 1.56 was used was taken to be 98.3 as the reference glossiness.) It was found that the glossiness of the samples processed according to the conventional supercalendering was 71, and the glossiness of the samples processed with the apparatus in accordance with the present invention was 135.

I claim:

1. An apparatus for smoothing the surface of a flexible magnetic recording medium, said apparatus comprising at least one set of two rolls one of said two rolls being a metal roll, said metal roll being highly planished, and the other of said two rolls being a resilient roll; a high-frequency dielectric heater provided prior to said two rolls; and a temperature regulator for controlling the surface temperature of said rolls, whereby the magnetic recording medium is first passed through said high-frequency dielectric heater and then passed through and pressed between said rolls.

2. An apparatus as defined in claim 1 wherein said resilient roll comprises a metal roll and a plastic layer formed on the surface of the metal roll.

3. An apparatus as defined in claim 1, wherein said temperature regulator controls the cooling of said rolls to maintain a desired surface temperature.

* * * * *